United States Patent
Berrayana et al.

(10) Patent No.: US 8,311,194 B2
(45) Date of Patent: Nov. 13, 2012

(54) METHOD AND SYSTEM FOR ESTABLISHING COMMUNICATIONS

(75) Inventors: Takoua Berrayana, Sousse (TN); Robert H. Hyerle, Bemin (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1341 days.

(21) Appl. No.: 11/629,097

(22) PCT Filed: Jun. 13, 2005

(86) PCT No.: PCT/EP2005/052717
§ 371 (c)(1),
(2), (4) Date: Dec. 11, 2006

(87) PCT Pub. No.: WO2005/125221
PCT Pub. Date: Dec. 29, 2005

(65) Prior Publication Data
US 2008/0292091 A1    Nov. 27, 2008

(30) Foreign Application Priority Data

Jun. 15, 2004  (EP) .................................... 04300379

(51) Int. Cl.
*H04M 15/00*    (2006.01)

(52) U.S. Cl. ................................ 379/114.2; 379/114.05

(58) Field of Classification Search .................. 379/111, 379/114.01, 114.03, 114.06, 114.09, 114.15, 379/114.17, 114.2, 114.28, 121.01
See application file for complete search history.

(56) References Cited

U.S. PATENT DOCUMENTS

| | | | | |
|---|---|---|---|---|
| 5,448,625 A * | 9/1995 | Lederman | ................ | 379/88.25 |
| 5,555,290 A * | 9/1996 | McLeod et al. | ............ | 379/88.25 |
| 5,555,298 A | 9/1996 | Jonsson | | |
| 5,592,537 A * | 1/1997 | Moen | ....................... | 379/88.11 |
| 5,903,629 A * | 5/1999 | Campbell et al. | .......... | 379/88.24 |
| 6,301,342 B1* | 10/2001 | Ander et al. | ............. | 379/114.13 |
| 6,314,171 B1* | 11/2001 | Dowens | ................... | 379/144.01 |
| 6,496,579 B1 | 12/2002 | Mashinsky | | |
| 6,539,219 B1 | 3/2003 | Gallant et al. | | |
| 6,788,771 B2* | 9/2004 | Manto | ..................... | 379/114.05 |
| 7,411,939 B1* | 8/2008 | Lamb et al. | ................ | 370/352 |
| 2002/0025028 A1* | 2/2002 | Manto | .................... | 379/114.05 |
| 2006/0274675 A1* | 12/2006 | Kizhnerman | ................ | 370/254 |
| 2008/0063161 A1* | 3/2008 | Joyce et al. | ............... | 379/114.2 |

* cited by examiner

Primary Examiner — Binh Tieu

(57) ABSTRACT

According to one aspect of the present invention, there is provided a system for establishing a communication between a first party and a second party, comprising: a data receiving subsystem for receiving from a third party details of the first and second party; and control logic for establishing a communication between the first and second party using the details supplied by the third party.

21 Claims, 3 Drawing Sheets

METHOD AND SYSTEM FOR ESTABLISHING COMMUNICATIONS

The present invention relates to the field of telecommunications and, more particularly, to a method and system for enabling a third party to cause communications, for example such as a telephone call, to be established between two parties.

Telecommunications networks, such as the public switched telephone network (PSTN), have undergone extensive change in recent times with technological advances leading to the provision of a wide range of advanced telecommunications services, such as voice mail, conference calling, email, instant messaging and so on. However, despite such advances the way in which some communications, such as telephone calls, are established has remained, from a user perspective at least, largely unchanged for some time.

Telephone calls, for example, are typically established between two parties; a calling party, who initiates the telephone call by dialing a telephone number, and a called party who receives the call.

In the early days of telephony a third party, i.e. a human telephony operator, was used to establish the call, by requesting the telephone number of the called party, establishing a call with the called party, and then connecting the calling party and the called party together. Modern telephony networks have replaced the human operator with intelligent networks (IN) which enable a calling party to establish a call simply by dialing the subscriber number associated with the called party.

In addition to the basic facilities provided by telephony networks there also exists a multitude of third party services, such as three-way calling, conference services and voice portals which enable a caller to establish a call with one or more other parties, such that all of the parties may enter into voice communications.

However, the way in which communications such as telephone calls are currently established lacks flexibility and it is desirable to further increase the ways in which telecommunications networks may be used thereby providing users with additional services, and network providers with increased ways of generating revenue.

Accordingly, one aim of the present invention is to provide additional ways for communications to be established.

According to a first embodiment of the present invention, there is provided a system for establishing a communication between a first party and a second party. The system comprises a data receiving subsystem for receiving from a third party details of the first and second party and control logic for establishing a communication between the first and second party using the details supplied by the third party.

Advantageously, this enables a third party to cause the establishment of a communication, such as a telephone call, between two separate parties, without the third party becoming party to the communication or call. In telephony systems, for example, this may be used to provide telephone subscribers additional ways of using telephone systems, for example by enabling a subscriber to offer a free or partly free telephone call between two other subscribers. In this way, a subscriber initiating a call may be billed for a call in which he takes no part. This may be beneficial, for example, to enable a subscriber having a prepay credit account to be able to use up unused call credit prior to the time expiration of the credit.

The communication may be a telephone call, in which case the control logic may be a service control point or alternatively a media platform.

Suitably the details include at least the telephone number of the first and second party.

Suitably the data receiving subsystem obtains, from the third party, a message to be output to the first and second party during the establishment of the communication.

The system suitably comprises billing logic for billing at least part of the cost of the communication to the third party.

The data receiving subsystem suitably obtains from the third party a limit for the communication. The limit may, for example, be a maximum billable amount or a maximum duration for the communication.

The control logic suitably terminates the communication when it is determined that one of the limits has been reached.

According to a second aspect of the present invention, there is provided a method of establishing a communication between a first party and a second party. The method comprises receiving from a third party details of the first and the second party, and establishing the communication between the first and second party using the details supplied by the third party.

Suitably the step of establishing the communication comprises establishing a telephone call.

The step of receiving suitably comprises receiving details of at least the telephone number of the first and second party.

Suitably a message is obtained from the third party for outputting to the first and second party during the establishment of the communication.

The method suitably also comprises billing at least part of the cost of the communication to the third party.

The method suitably also comprises receiving from the third party a limit for the communication. The limit may be, for example, a maximum billable amount or a maximum duration.

The method suitably comprises terminating the communication when it is determined that one of the limits has been reached.

According to a third aspect, there is provided a telecommunications system according to the system outlined above.

According to a fourth aspect, there is provided a telecommunications system operable according to the method outlines above.

Embodiments of the invention will now be described, by way of example only, with reference to the accompanying diagrams, in which.

Figure 1:
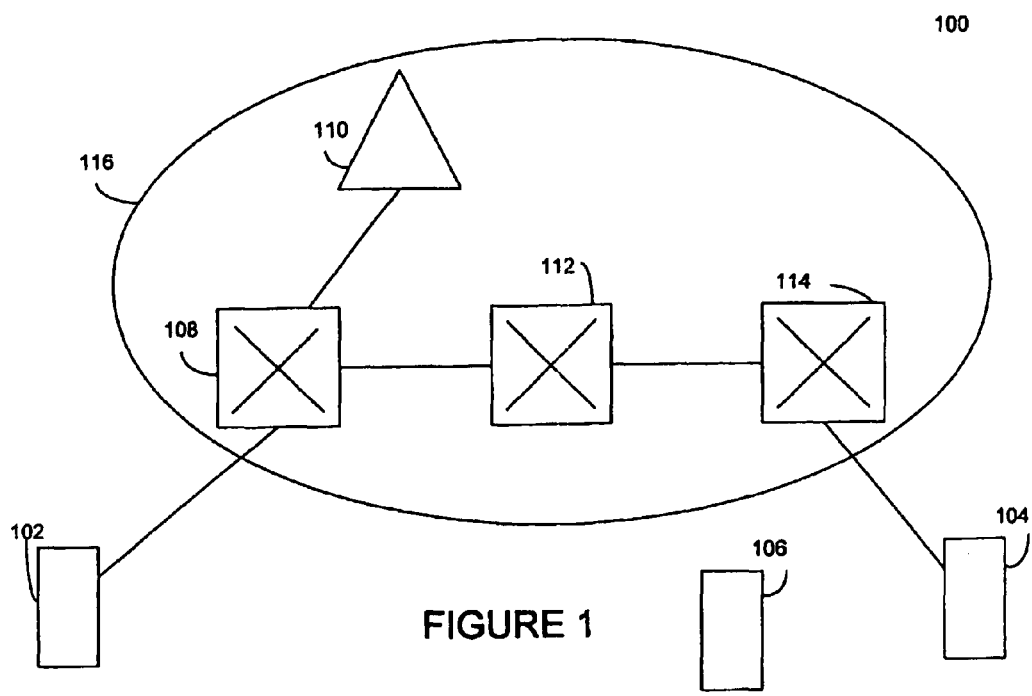
FIG. 1 is a block diagram of a typical telecommunications system according to the prior art.

FIG. 1 shows a block diagram of a typical telecommunications system 100 according to the prior art. A telecommunications network 116, which may be a common channel signaling (CCS) system such as an SS7 network, enables a calling party 102 to establish a call with a called party 104, for example by the calling party 102 dialing the subscriber number of the called party 104.

The telecommunications network 116 comprises a number of telephony switches: an originating switch 108; a terminating switch 114; and an intermediate switch 112. A service control point (SCP) 110 is accessible via the switch 108. When the calling party 102 wishes to make a call to the called party 104, the calling party 102 dials the subscriber number of the called party 104. The dialed digits are sent in DTMF form to the switch 108 which determines whether it is able to route the call to the terminating switch 114. If the switch is unable to route the call, for example if the subscriber number dialed is an 800 or other non-geographic number, the switch requests a number translation from the SCP 110 and the call is routed to the terminating switch 114 in the normal manner. As will be appreciated by those skilled in the art, the SCP also generates a billing record to enable the calling party to be billed for the call.

Figure 2:
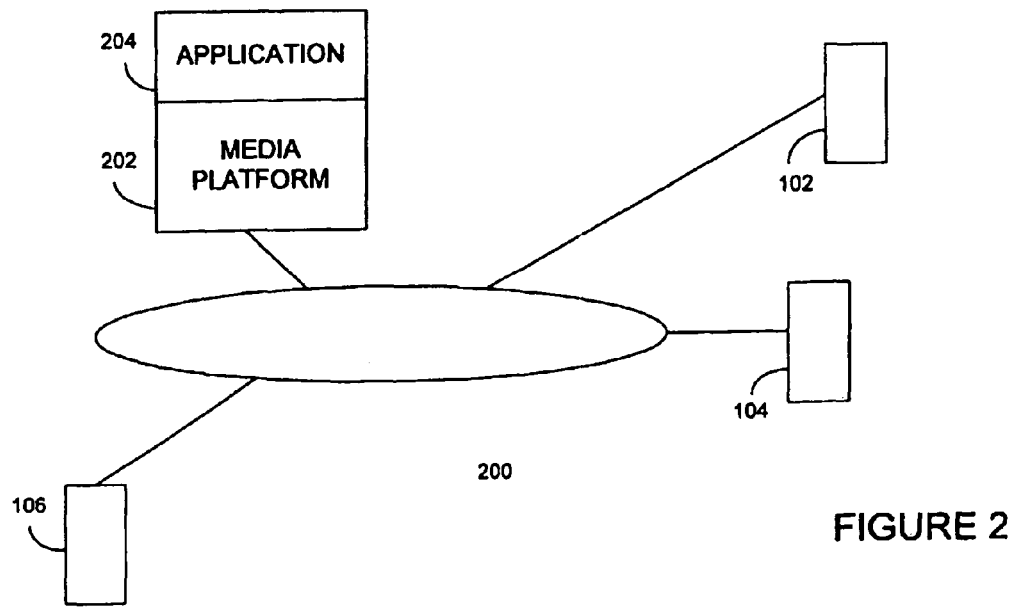
FIG. 2 is a block diagram of a system 200 which enables a third party to cause a call to be established between a first and a second party, according to a first embodiment.

Referring now to FIG. 2, there is shown a block diagram of a system 200 which enables a third party 106 to cause a call to be established between a first and a second party, 102 and 104 according to a first embodiment. A media platform 202, such as a Hewlett Packard Open Call Media Platform (OCMP), provides an advanced telecommunications processing environment providing telecommunications hardware capable of receiving, making and generally managing telephone calls, as well as processing facilities for performing processing tasks such as DTMF tone detection, speech recognition, text-to-speech conversion and the like. The media platform may be either integrated in the telecommunications network 116, or may be provided external thereto, as shown in FIG. 2. A voice application 204 runs on the media platform, 202 for providing application-specific control of the media platform functionality.

Figure 3:
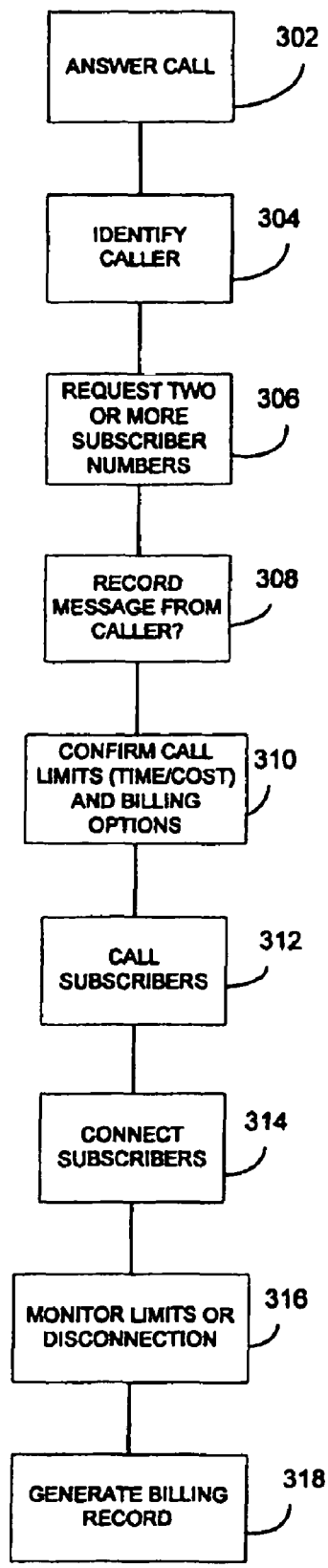
FIG. 3 is a flow diagram outlining example steps taken by the voice application 204 of FIG. 2.

The operation of the system 200 of FIG. 2 is outlined by way of the flow diagram of FIG. 3.

A third party 106 places a call, using a subscriber number, to a data receiving subsystem, such as the voice application 204 running on the media platform 202. The voice application 204 answers the call (step 302) and identifies the third party 106 (step 304), for example by recognizing the caller liner identification (CLI) of the caller.

The voice application 204 preferably greets the third party 106 with one or more voice messages which are preferably arranged as a voice menu to facilitate the navigation of the voice application 204.

The third party 106 is requested (step 306) to enter the subscriber numbers of two or more other subscribers which the third party 106 wishes a call to be established between. For example, the third party may wish a call to be established between the subscriber 102 and the subscriber 104. The subscriber numbers may be entered in any number of ways, for example including using DTMF tones sent from the third party's 106 telephone handset, by using speech recognition, and through reception of one or more short (SMS) messages. Alternatively, if the third party 106 has an account with the service provider providing the voice application, the third party 106 may select the subscriber numbers from a pre-stored telephone subscriber contacts list retrieved by the voice application upon identification of the third party 106.

The voice application 204 asks the third party 106 (step 308) if he wishes to record a voice message which will be heard by the subscribers 102 and 104 whilst the call between the subscribers 102 and 104 is being connected. For example, the third party may wish to record a message such as: "Hello, this is John. I need you, Steve and Mary, to talk to each other. Please wait while you're connected.".

The voice application 204 then confirms any call billing options (step 310). For example, typically the third party 106 may elect to be billed for the call made between the subscribers 102 and 104. To enable the third party 106 to be billed the third party 106 may, for example, have an account with the service provider who provides the voice application 204. In this case the identification step 304 may comprise identifying the caller 102 as having an account and obtaining account information relating to the third party 106. The third party account may be billed upon completion of any calls made by the voice application on-behalf of the third party.

Alternatively, the voice application may request a valid credit card number, or other suitable payment system, to enable the cost of the call to be billed accordingly.

Since the third party 106 will take no part in the call between the subscribers 102 and 104 he has no control over the duration or cost of the call. Accordingly, the voice application 204 preferably requests the third party 106 to enter (step 310) an optional time or a cost limit for the call. For example, the third party 106 may limit the duration of a call by specifying the maximum duration of the call, or by specifying a maximum billable amount for the call. If the third party 106 specifies a cost limit for the call the voice application preferably calculates approximate maximum time duration for the call, based on the cost limit and the call charges applicable to the specified destination subscriber numbers. Alternatively, if the third party 106 specifies a time limit for the call the voice application preferably calculates an approximate maximum cost of the call based on the specified time limit and the specified destination subscriber numbers. Preferably the calculated maximum call cost or maximum call duration is indicated, for information purposes, to the third party 106, for example using a synthesized voice message. If the maximum call cost or maximum call duration are not acceptable by the third party 106, the voice application 204 preferably requests the third party 106 to modify the call limits.

At this point the third party 106 may hang up.

The voice application 204, through the media platform 202 or other suitable control logic, establishes (step 312) separate calls with each of the subscribers 102 and 104. When each of the subscribers 102 or 104 answers the call the prerecorded message left by the third party is played by the voice application 204 to the subscriber, whilst waiting for the remaining subscribers specified by the third party 106 to answer the call. If the third party 106 did not leave a prerecorded message the voice application 204 preferably plays a predetermined voice message to indicate to the subscriber that a call connection attempt is in progress.

When both of the subscribers 102 and 104 have answered the call the voice application 204 causes the media platform 202 to connect (step 314) the two calls together, thereby allowing the subscribers 102 and 104 to enter into voice communications. In some circumstances it may be preferable that the voice message recorded by the third party be played in its entirety to each subscriber prior to connecting the calls together, thereby ensuring that the two subscribers 102 and 104 are aware of the reason for, or by whom, the call establishment request has been made. If the third party 106 has specified any limits to the call, details of these limits, such as the expected maximum call duration, are preferably notified to the subscribers, for example through use of a voice synthesizer.

The voice application 204 monitors (step 316) the call for the expiry of any limit previously set by the third party 106. Upon expiration of any limit the voice application 204 call may disconnect or terminate the call. A disconnection may be preceded by a voice message played to the parties to the call. The voice application 204 also monitors the call to determine if any of the subscribers 102 or 104 hangs up, and if so disconnects the call if there is only one remaining subscriber in the call.

In a further embodiment, upon expiry of a limit instead of disconnecting the call the voice application may offer to the subscribers 102 and 104 that the call be continued providing that at least one of the subscribers offers to be billed for the remaining time of the call. In this case, the voice application 204 may present suitable voice menus to enable one of the subscribers to enter a credit card number, for example, to which the remaining call charge be billed.

Once either a limit has been reached or the call has been disconnected by the voice application 204, a billing record is generated (318). The amount of the call indicated by the billing record may then be billed to the third party 106 user account, or billed to the credit card identified by the third party as described above.

If the third party 106 has a mobile telephone with a pre-pay account, the third party 106 may request that the pre-pay account is debited for the call between the subscribers 102 and 104. This may be achieved, for example, by the third party entering the subscriber number of the mobile device, or by the voice application 204 obtaining the subscriber number of the mobile device by way of the network provided CLI.

The above example uses a voice application to obtain the subscriber numbers of the subscribers 102 and 104 from the third party 106, and uses the telephony functionality provided by a media platform to establish calls with the subscribers 102 and 104 and to connect the two calls together.

In a further embodiment, the functionality provided for by the media platform is provided by a service control point (SCP) in a SS7 telecommunications network, as is described below with reference to FIG. 4.

Figure 4:
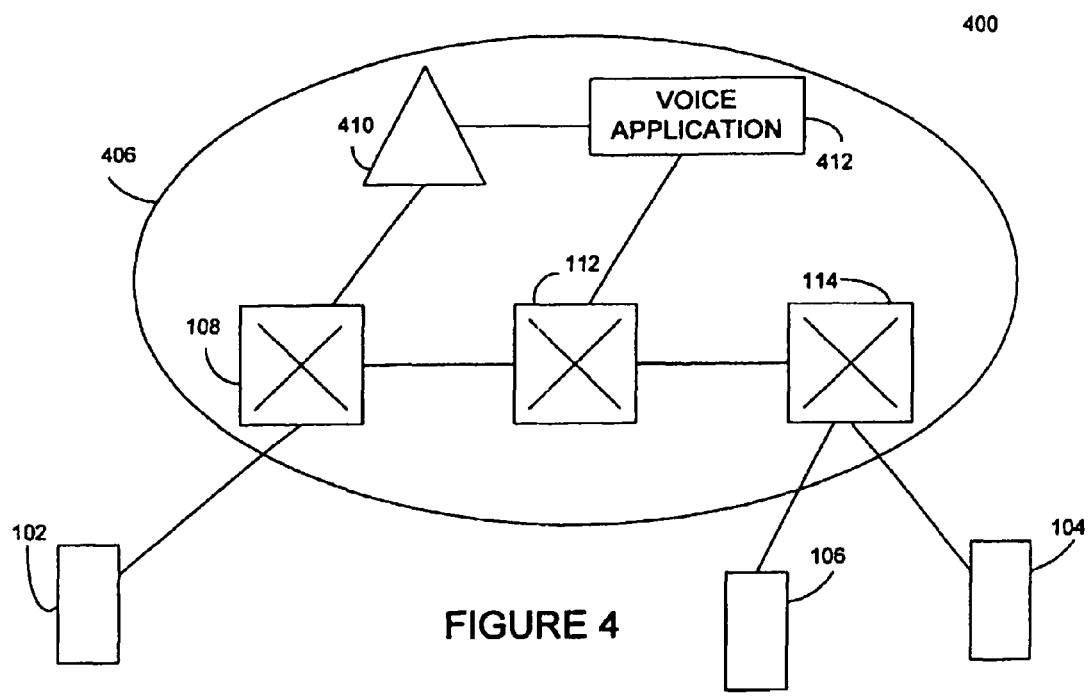
FIG. 4 is a block diagram of a telecommunications system according to a further embodiment.

Referring now to FIG. 4, there is shown a block diagram of a telecommunication network 406 comprising a number of switches 108, 112 and 114 and an SCP 410. The SCP is preferably compliant with the ETSI CS-3 IN standard which provides the ability for an SCP to initiate calls from the network. A voice application 412 provided by the network provider provides functionality similar to that of the voice application 204 of FIG. 2. That is, the voice application obtains, from a third party 106, the subscriber numbers of at least two subscribers, 102 and 104, that the third party 106 wishes to be connected together in a call. The voice application also obtains the subscriber number of the third party 106.

The obtained subscriber numbers, together with the subscriber number of the third party and sent by the voice application 412 to the SCP 410 in a suitable format to cause the SCP 410 to establish a separate call with each of the subscribers 102 and 104. The information sent by the voice application 412 to the SCP 410 may be sent in a variety of different ways, for example in a proprietary manner or using a standardized interface such as Parlay.

When both of the subscribers have answered, the SCP connects to the subscribers in a single call using standard signaling protocols (ETSI CS-1) or, alternatively, using proprietary protocols within the switched network.

The SCP 410 may monitor the call during establishment, during the connected period, and during the call disestablishment to enable the SCP 410 to bill the call as well as limit the call's duration. The SCP 410 can use information gathered from the voice application 412 to obtain billing and limit information for the call. For example, the call can be billed to the third party and/or limited at the request of the third party. This requires a trust relationship between the voice application 412 and the SCP 410. Alternatively, the original call by the third party to request the subsequent call will generate authentic information about the third party including billing information. That is, the third party's calling number is used for subsequent billing of the requested call.

It will be appreciated that the operation of the above-described voice application is merely exemplary, and functional steps made by the voice application may be removed or added depending on the required functionality. For example, it may be desirable to obtain from the third party a time and a date of when the call establishment attempt between the subscribers should be made, thereby allowing communications to be established at a later time. It may also be desirable for the third party to be able to specify the number of call establishment attempts to be made, if for instance one or more of the subscribers is not available or does not answer when the call establishment request is made.

The above described embodiments enable a caller using a so-called 'black phone' to cause a call to be established between two other parties, without the caller becoming a party to the call.

Those skilled in the art will appreciate that the above described concepts are not limited for use with a PSTN or SS7 type telecommunications network, and are adaptable for use with other types of telecommunications networks and systems. For example, use may also be made of session initiation protocol (SIP) networks. Such techniques may also be applied to other fields of communication, such as instant messaging and electronic chat.

The invention claimed is:

1. A system for establishing a communication between a first party and a second party, comprising:
    a data receiving subsystem for receiving from a third party details of the first and second party and for obtaining from the third party a voice message to be output to the first and second party during the establishment of a communication, wherein the first, second and third parties are users; and
    control logic for establishing a communication between the first and second party using the details supplied by the third party, wherein the third party causes the communication to be established without requiring the third party to participate in the communication.

2. A system according to claim 1, wherein the data receiving subsystem is a voice application.

3. A system according to claim 1, wherein the control logic is a service control point.

4. A system according to claim 1, wherein the control logic is a media platform.

5. A system according to claim 1, wherein the communication is a telephone call.

6. A system according to claim 1, wherein the details include at least the telephone number of the first and second party.

7. A system according to claim 1, further comprising billing logic for billing at least part of a cost of the communication to the third party.

8. A system according to claim 1, wherein the data receiving subsystem is further adapted for obtaining from the third party a limit for the communication.

9. A system according to claim 8, wherein the limit for the communication is a maximum billable amount.

10. A system according to claim 8, wherein the limit for the communication is a maximum duration.

11. A system according to claim 8, wherein the control logic is adapted for terminating the communication when it is determined that one of the limits has been reached.

12. A telecommunications system comprising a system according to claim 1.

13. A method of establishing a communication between a first party and a second party, comprising:
    receiving from a third party details of the first and the second party, wherein the first, second and third parties are users;
    obtaining from the third party a voice message for outputting to the first and second party during the establishment of the communication; and establishing the communication between the first and second party using the details supplied by the third party, wherein the third party causes the communication to be established without requiring the third party to participate in the communication.

14. A method according to claim 13, wherein the step of establishing the communication comprises establishing a telephone call.

15. A method according to claim 13, wherein the step of receiving further comprises receiving details of at least one or more telephones number of the first and second party.

16. A method according to claim 13, further comprising billing at least part of a cost of the communication to the third party.

17. A method according to claim 13, further comprising receiving from the third party a limit for the communication.

18. A method according to claim 17 wherein the step of receiving a limit further comprises receiving a maximum billable amount.

19. A method according to claim 17, wherein the step of receiving a limit further comprises receiving a maximum duration.

20. A method according to claim 13, further comprising terminating the communication when it is determined that one of a number of limits has been reached.

21. A telecommunications system operable according to claim 13.

* * * * *